(12) United States Patent
Casagrande et al.

(10) Patent No.: US 12,115,943 B2
(45) Date of Patent: Oct. 15, 2024

(54) BIKE RACK FRAME CLAMPS, SYSTEMS AND METHODS

(71) Applicant: SEASUCKER, LLC, Bradenton, FL (US)

(72) Inventors: Charles L. Casagrande, Bradenton, FL (US); Brad Kapper, Bradenton, FL (US)

(73) Assignee: Seasucker, LLC, Bradenton, FL (US)

( * ) Notice: Subject to any disclaimer, the term of this patent is extended or adjusted under 35 U.S.C. 154(b) by 156 days.

(21) Appl. No.: 17/761,964

(22) PCT Filed: Sep. 21, 2020

(86) PCT No.: PCT/US2020/051810
§ 371 (c)(1),
(2) Date: Mar. 18, 2022

(87) PCT Pub. No.: WO2021/055949
PCT Pub. Date: Mar. 25, 2021

(65) Prior Publication Data
US 2022/0340087 A1    Oct. 27, 2022

Related U.S. Application Data
(60) Provisional application No. 62/903,488, filed on Sep. 20, 2019.

(51) Int. Cl.
*B60R 9/10* (2006.01)
*B25B 5/00* (2006.01)
(Continued)

(52) U.S. Cl.
CPC .............. *B60R 9/048* (2013.01); *B25B 5/006* (2013.01); *B25B 5/04* (2013.01); *B25B 11/007* (2013.01); *B60R 9/10* (2013.01)

(58) Field of Classification Search
CPC .......... B60R 9/048; B60R 9/10; B25B 5/006; B25B 5/04; B25B 11/007
(Continued)

(56) References Cited

U.S. PATENT DOCUMENTS 607,545 A * 7/1898 Martin ..................... B62H 3/00
24/457
6,296,162 B1    10/2001 Englander et al.
(Continued)

FOREIGN PATENT DOCUMENTS

EP    2974910 A1    1/2016

OTHER PUBLICATIONS

International Search Report for PCT/US2020/051810 mailed Feb. 4, 2021.
Written Opinion for PCT/US2020/051810 mailed Feb. 4, 2021.

*Primary Examiner* — Adam J Waggenspack
(74) *Attorney, Agent, or Firm* — Sandberg Phoenix & von Gontard, P.C.

(57) ABSTRACT

A quick-release clamp for a vehicular mount or rack having a rigid stationary first jaw with a clamping surface, and a rigid second jaw opposite with a clamping surface oriented to face the first jaw clamping surface. The second jaw is movable between an open and a closed position relative to the first jaw, where the closed position is capable of retaining one or more objects to be clamped transversely between said jaws. A lever, attached to a variable tensioning system operates to open and close the jaws when sufficient force is applied to overcome the tension of the tensioning system.

17 Claims, 4 Drawing Sheets

(51) Int. Cl.
*B25B 5/04* (2006.01)
*B25B 11/00* (2006.01)
*B60R 9/048* (2006.01)

(58) Field of Classification Search
USPC ................................ 224/315, 323, 331, 924
See application file for complete search history.

(56) References Cited

U.S. PATENT DOCUMENTS

| | | | | |
|---|---|---|---|---|
| 6,761,297 B1* | 7/2004 | Pedrini | ................ | B60R 9/10 |
| | | | | 224/570 |
| 2014/0124551 A1* | 5/2014 | Condon | ................ | B60R 9/048 |
| | | | | 224/324 |
| 2019/0016271 A1* | 1/2019 | Garceau | ................ | B60R 9/06 |

* cited by examiner

BIKE RACK FRAME CLAMPS, SYSTEMS AND METHODS

CROSS-REFERENCE TO RELATED APPLICATIONS

This application is the U.S. National Stage under 35 U.S.C. § 371 of PCT/US2020/051810, filed Sep. 21, 2020, which claims priority to U.S. Provisional Application No. 62/903,488 filed Sep. 20, 2019 entitled BIKE RACK FRAME CLAMPS, SYSTEMS AND METHODS, and which is incorporated herein by reference.

STATEMENT REGARDING FEDERALLY SPONSORED RESEARCH

Not Applicable.

BACKGROUND

The present disclosure relates to bike rack clamps (and clamps for other recreational articles) used to secure transported bikes, etc. to a rack. More particularly, the present disclosure relates to such clamps and systems and methods employing them as constructed and configured which generally do not require dismantling any portion of the transported bike, etc., especially one of the bike's tires.

Bike racks can include one or more clamps which secure the bike to the bike rack, especially during transport of the bike(s). In the usual case, the front or rear tire needs to be dismantled as part of the bike's securement and the actual clamping can itself take time and be a somewhat involved process.

Ideally the clamping mechanism should require the bicyclist to do little more than place a portion of the bike, e.g., a tire or frame, into the clamping mechanism, resulting in rapid, secure clamping of the bike with few steps involved and no dismantling of the bike. Accordingly, a frame clamp which overcomes these issues is desirable.

BRIEF SUMMARY OF THE INVENTION

Applicant has developed bike, etc. rack frame clamps which greatly improve the clamping of bike frames, handle bars, tires and other bike components to bike racks and other frame-like units by overcoming clamping issues of the type discussed herein.

DESCRIPTION OF THE DRAWINGS

In the accompanying drawings which form part of the specification.

DETAILED DESCRIPTION

Figure 1:
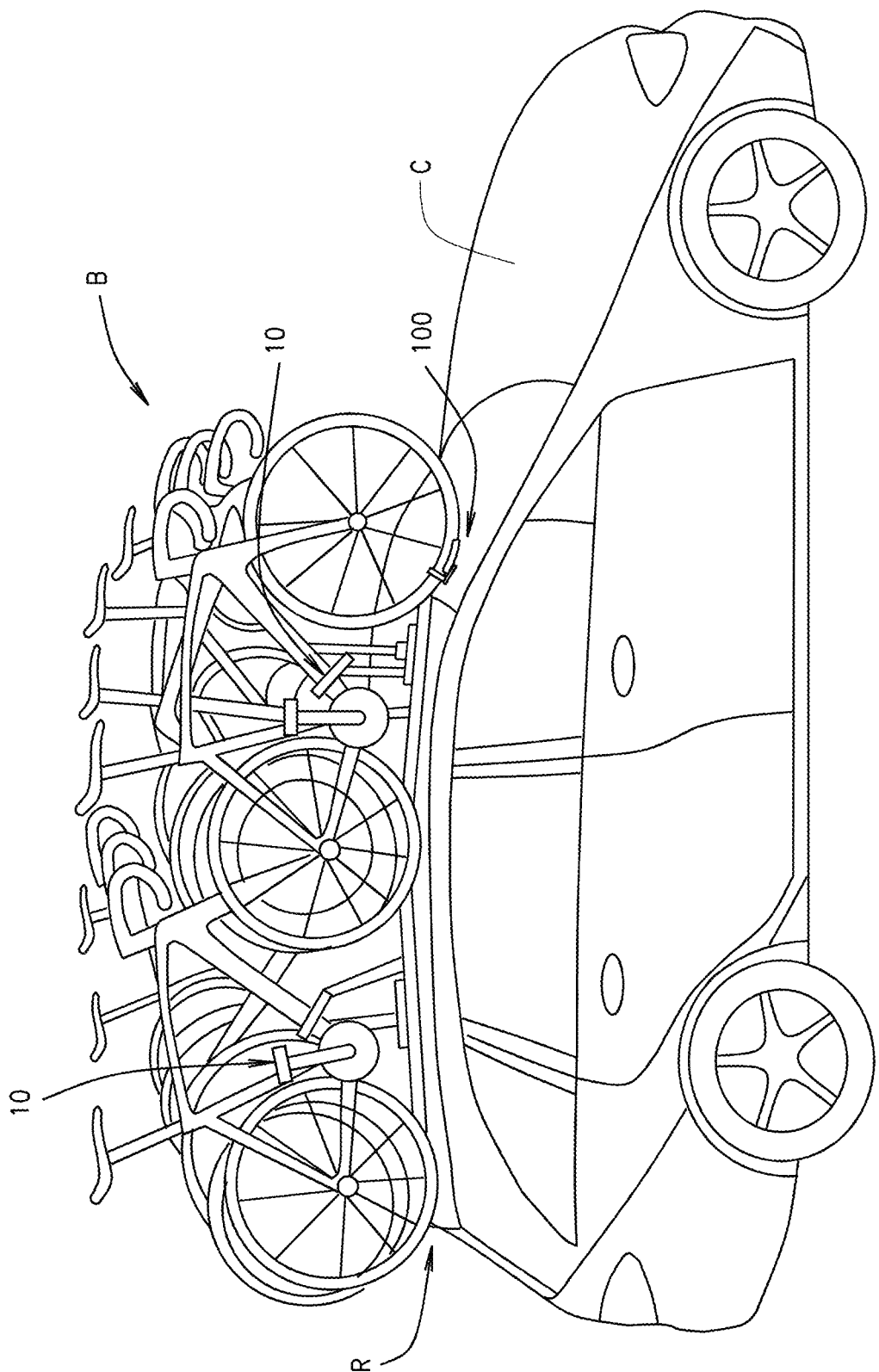
FIG. 1 is a perspective view of a vacuum-based multi-bike rack mounted to the top of a vehicle with multiple embodiments of a bicycle frame clamp incorporating features of the present invention attached to the rack.

The following detailed description illustrates the claimed invention by way of example and not by way of limitation. The description enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

As shown in FIG. 1, a perspective view of a vacuum-based team rack R atop the roof of a car C is shown, in which multiple bicycles B are attached to the rack R with various embodiments (10 and 100) of a frame clamp constructed and used according to the present disclosure. While a variety of team racks with or without vacuum-based attachment devices could be utilized, the team rack shown in FIG. 1 is an embodiment constructed according to the general principles described and referred to in pending Application No. PCT/US2018/036951, filed on Jun. 11, 2018, and employs the vacuum cup attachment devices as generally described therein. That application, and prior application Ser. No. 13/497,653 and issued U.S. Pat. No. 9,821,721, disclose certain of these vacuum-based mounted carriers for use in transporting bicycles and other articles such as other recreational equipment, provide additional teachings related to this invention's use, and each is hereby fully incorporated herein by reference as though expressly set forth herein.

Figures 2A, 2B:
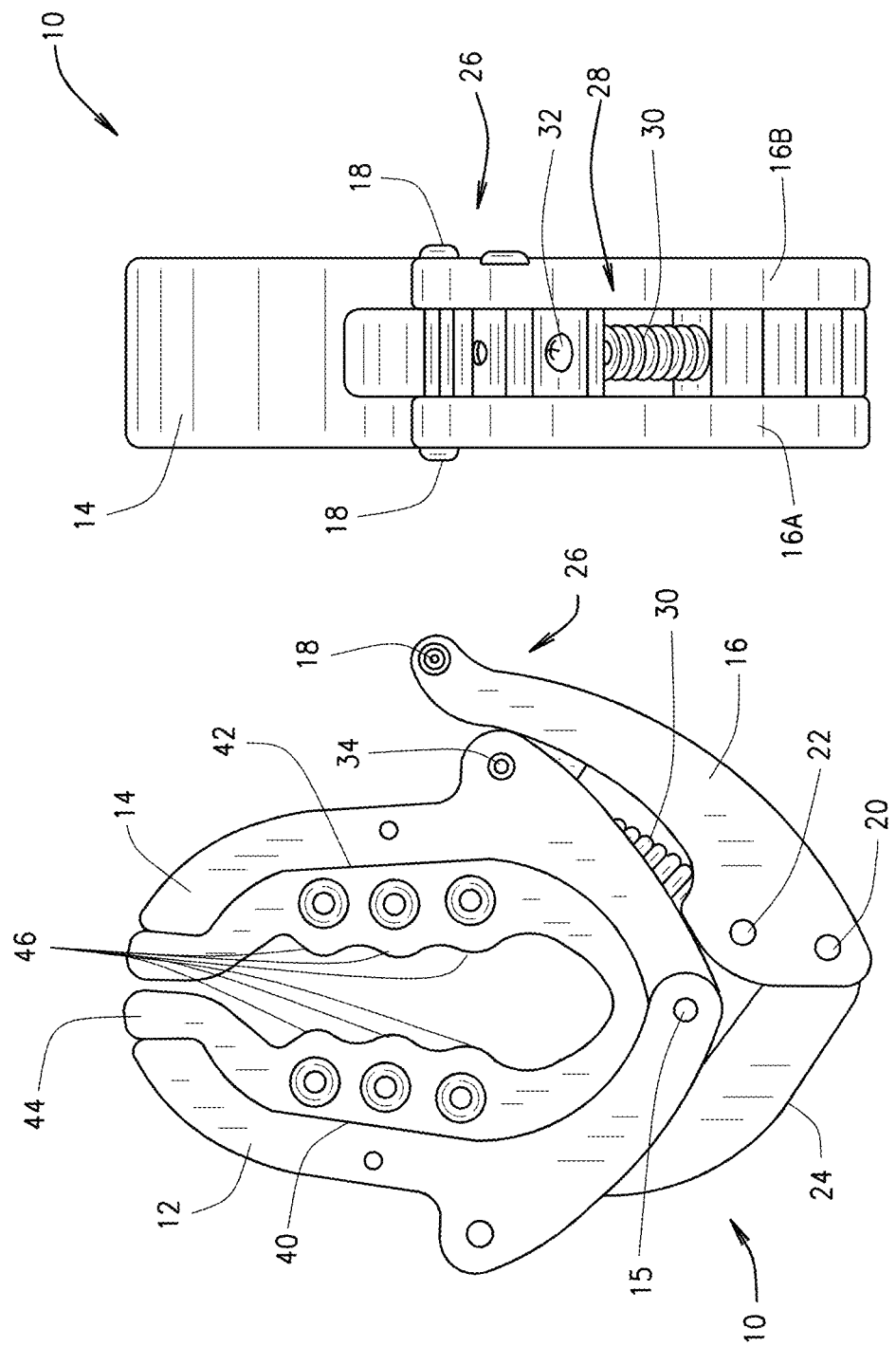
FIG. 2A is a front plan view of a first representative embodiment of one of the tension-adjustable frame clamps shown in FIG. 1, incorporating features of the present invention.
FIG. 2B is a side plan view of the tension-adjustable frame clamp shown in FIG. 2A.

As shown in more detail in FIGS. 2A and 2B, e.g., a first representative embodiment of a quick-release clamp 10 is provided. The assembly 10, shown in place attached to bike frames securing them to the multi-bike rack R shown in FIG. 1, comprises a set of primary interconnected parts. A stationary clamp jaw 12 is constructed to be positioned opposite a movable jaw 14 that includes a lever 16 to effectuate movement of the jaw 14. The jaws 12 and 14 are pivotally joined at their lower ends by a transverse pin 15, such that the jaws 12 and 14 can rotate about the pin 15 to move between open and closed positions relative to each other, as can be appreciated.

The lever 16 has two parallel and matching plates, 16A and 16B, that are separated by a gap of approximately one-half inch, but that together form the lever 16. Pins 18, 20 and 22 hold the plates 16A and 16B together. A flat and rigid fixed jaw tab 24 is rigidly attached at its upper end to the lower portion of the fixed jaw 12. The tab 24 extends generally downward away from the jaw 12 to a point below the pin 15, separated from the jaws 12 and 14 by approximately one-half inch. The pin 20 pivotally attaches the lower end of the tab 24 to the lower end of the lever 16.

The lever 16 has an arm or handle 26 that extends from the upper end of the lever 16 to aid in the opening and closing of the clamp 10. Additionally, the clamp 10 has an variable tension system 28 that includes a coil spring 30 to induce self-closing of the clamp jaws 12 and 14 toward each other, when no counter-vailing force strong enough to move the jaws to a more open position is applied. The tension system 28 is pivotally attached to the lower portion of the lever 16 by the pin 22, and pivotally attached to the outer mid-section of the movable jaw 14 by a pivot pin 34. The coil spring 30 surrounds an adjustment screw 32 that controllably compresses the spring 30 to allow a user to set the tension in the tension system 28. The tension in the tension system 28 can be readily adjusted by turning the screw 32 to accommodate different sized bike frames or other components to be clamped between the jaws 12 and 14, as can be appreciated. That is, the adjustable tension system 28 allows the angle of the clamp 10, i.e. the distance between the jaws 12 and 14 when closed to be adjusted for different sizes, shapes and types of bike frames and other portions of bicycles/recreational devices.

The jaw 12 has a clamping surface 40 that is directed toward a clamping surface 42 of the jaw 14. The jaws 12 and 14 of the clamp 10 can be specially configured to snugly attach to a particular bike frame, wheel or other portion of a recreational device, depending on its target article. In this embodiment, the clamp 10 includes a pliant pad or jaw liner 44 attached to the clamping surfaces 40 and 42 of the jaws 12 and 14. As can be seen, the inner surface of the liner 44 has a contoured surface with a series of grips or protuberances 46 facing each other across the gap between the jaws 12 and 14. As can be appreciated, the grips 46 are shaped and sized to resiliently yet firmly hold a bike frame or other component between the jaws 12 and 14 when the jaws are closed. Of course, liner 44 can alternatively be constructed in more than one piece and can be placed only on one of the two jaws 12 and 14. Further, the jaws 12 and/or 14 can alternatively have one or more independent cushioning points, to better cushion the object being clamped.

As can be appreciated, when the clamp 10 is in its closed position as shown in FIGS. 2A and 2B, one or more objects, such as a bicycle frame or other component, can be snugly secured in a transverse position between the clamping surfaces 40 and 42 of the jaws 12 and 14, respectively. The liner 44 further cradles the object or objects to be clamped and provides a series of nesting positions for the object(s) to be clamped between the grips 46. The tension system 28 provides a spring bias or tension between the lever 16 and the tab 24 that holds the lever 16 against the side of the movable jaw 14 to keep the clamp 10 in a closed position. By applying a pulling force against the handle 26 of the lever 16 sufficient to overcome the coil spring tension, a user can pull the lever 16 away from the side of the jaw 14 to release the jaw 14 from its closed position and move or urge the jaw 14 apart from the jaw 12 to an open position (not shown). As one of ordinary skill will readily understand, when in the open position, the object(s) to be clamped can be placed in the gap between the jaws 12 and 14 for clamping, or object(s) already clamped can be removed from between the jaws 12 and 14.

Figure 3:
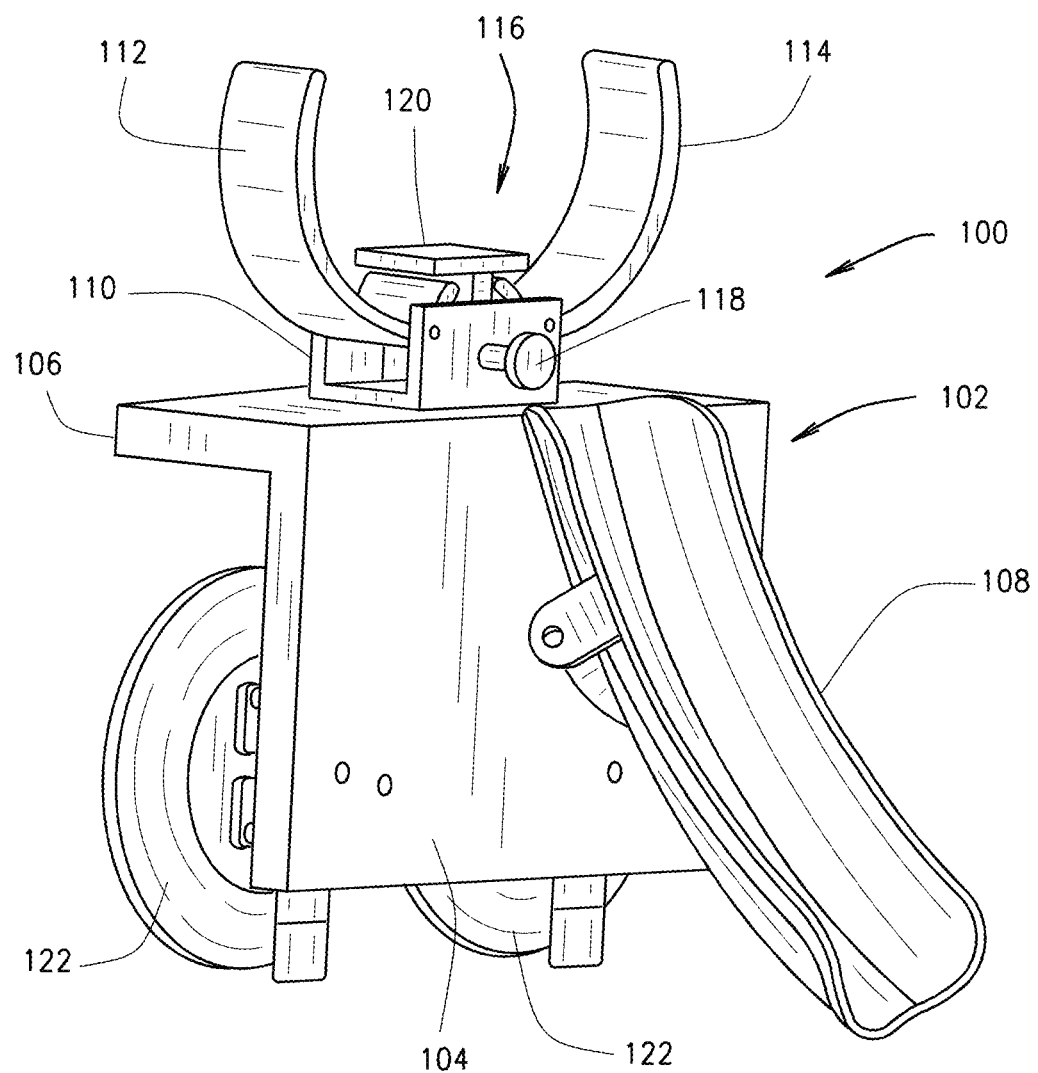
FIG. 3 is a view of a second representative embodiment of one of the tension-adjustable frame clamps shown in FIG. 1, incorporating features of the present invention.

FIG. 3 shows a view of an alternative embodiment 100 of the clamp of the present disclosure. The clamp 100 has a rigid, L-shaped base 102 constructed of two rectangular flat plates, a vertically oriented lower plate 104 and a horizontally oriented upper plate 106, positioned at a 90 degree angle relative to each other. A curved bike wheel tray 108 is attached to the center of the vertical plate 102 near the junction between the plates 104 and 106. As can be seen, the wheel tray 108 is shaped and sized to readily receive and hold a small portion of a bicycle wheel or tire (see FIG. 1, where the base 102 has been modified to have a curved shape—instead of an "L-shape" in order to fit the upper contour of the vehicle C as shown). A channel-shaped clamp brace 110 is attached to the center of the upper surface of the upper plate 106. Two rigid and upwardly arcuately curved, opposing mating jaws 112 and 114 extend out of the channel of the brace 110. The lower ends of each of the jaws 112 and 114 rotatably attach to a trip actuator 116 positioned in the channel of the brace 110. The actuator 116 is operatively associated with the two jaws 112 and 114 to rotate the jaws together into a closed position (not shown) when the actuator 116 is triggered. The clamp 100 has two such triggers that can each independently trigger the actuator. A front trigger 118 extends from inside the channel brace 110, through the side of the channel brace 110 and outward approximately one inch to face the wheel tray 108. A top trigger 120 extends upward from the center of the channel brace 110 between the movable jaws 112 and 114. When either of the triggers 118 or 120 is sufficiently depressed toward the channel brace 110, the actuator will move within the brace 110 and force the movable jaws 112 and 114 towards each other to close about an object or objects positioned between the jaws.

The lower vertically oriented plate 104 is attached to a pair of vacuum cups 122 that enable the entire clamp 100 to be readily and removably attached to a desired surface, such as for example the side or top of a vehicle.

In this embodiment, when a bike frame, tire or other part of a bike or recreation article meant to be secured, e.g., to an auto, truck or boat, activates the auto-closing mechanism 116, the oppositional arcuate jaws 112 and 114 of the clamp 100 are activated to come together and lock over the frame, tire, etc. As shown in this embodiment, vacuum cups 122 are attached to the back-side of the clamp frame and a wheel tray 108 to optionally capture a bike's front wheel attached to the front frame portion of the clamp 100. As can be appreciated, no levers, straps, knobs need be pressed, chinked tight or turned in order of the clamp 100 to secure an object between the jaws 112 and 114. The clamp 100 can also be used to stand a bike up in the back of a pickup truck when placed on the back window of the truck. The user would simply roll the bike forward into the clamp, latching the clamp arms around the tire to hold the bike upright. In yet another embodiment of this clamp 100, the clamp would have a base configured to fit over the tailgate of a pickup truck, and the clamp then attaches to the outside of the tailgate by the use of vacuum cups. The bike's front tire can hang over the tailgate and be secured in a wheel tray, such for example as the wheel tray 108. The down tube of the bicycle frame would in such a configuration be captured (i.e., "clamped") by the auto-closing clamp 100 on top of the tailgate. This clamp 100 can also be used to secure a variety of items such as wheel chairs, ladders, construction supplies and recreational and other equipment.

The clamp 100 can be used, e.g., with the multi-bike rack of FIG. 1, as shown. Other uses of the embodiment shown in FIG. 3 include the rear of vans, SUVs and hatchbacks, to capture a bike's wheel and hang it vertically without the need to remove any components from the bike. For example, a bike's tire could be readily pressed into the clamp 100 and have the clamp 100 automatically close around it without any additional input by the rider/user.

Figure 4:
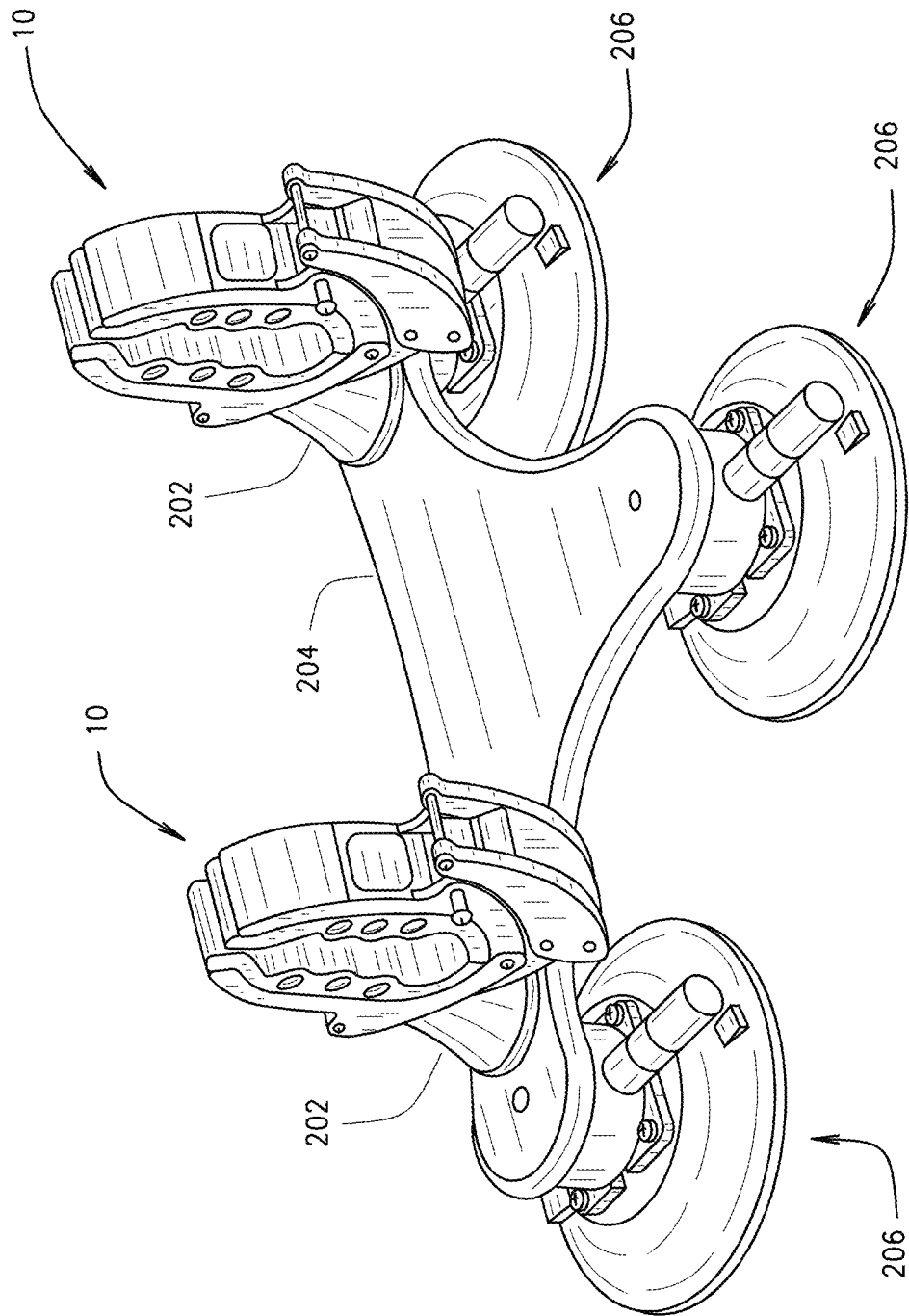
FIG. 4 is a perspective view of a pair of frame clamps of the embodiment shown in FIG. 2A attached to a vacuum-based bike rack mount.

FIG. 4 depicts an embodiment of a handlebar mount bike rack utilizing the clap 10 as shown and described hereinabove. In this rack, the two clamps 10 are each rigidly attached with mounts 202 to a common flat, T-shaped base plate 204. Each end of each of the three legs of the base plate 204 has a vacuum cup securement device 206 attached on the side of the plate 204 facing away from the clamps 10. Each of the vacuum cup securement devices 206 are of the type described (and incorporated herein by reference) in Application No. PCT/US2018/036951 and the other patent references incorporated above.

As can be appreciated, the vacuum cups 206 can be used to readily and removably attached to a desired surface, such as for example the side or top of a vehicle. A bicycle frame or other bicycle component or other object or set of objects can then be clamped in the jaws of the clamps 10 as more fully described above. In the embodiment depicted in FIG. 4, the clamps 10 are aligned in parallel and spaced apart so that they are conveniently positioned to capture the handlebars of a bicycle, but such spacing can be adjusted so that other portions of bicycles or other recreational articles, e.g., skis, a snowboard, a surfboard, a canoe, or kayaks, are being held by the two self-tensioning and adjustable clamps 10.

In each of the above vacuum-attached devices, the invention provides for cushioning of the clamp at any and all points of securement, which inhibits breakage and also marring of the bike frame or other portion of the bike or recreational article being secured.

Another advantage provided by the invention is that the clamps described herein are readily adjustable for varying sizes and shapes of bike frames and racks for which they may be used. Once set at a particular angle, the user can repeatedly re-set it to the same configuration, thus allowing it to make accommodations to different styles and configurations of bikes and configurations, e.g., of objects such as crank arms, while making the clamping task easily accomplished on an ongoing basis. Additionally, the clamps are configurable to be set to a certain pre-determined dimension to avoid the making of any adjustments by the user, if desired.

The various clamps and clamping systems described and depicted herein permit bicyclists and other recreationalists and users to quickly, easily and securely clamp down their bikes, etc. and take off and go to their next destination without delay.

The frame clamps 10 and 100 are sized and shaped to couple with articles, especially bikes, but can alternatively be used to clamp other recreational articles and items. For example, when the clamp 10 or 100 is coupled to vacuum carrier systems such as sold by SeaSucker (see, e.g., U.S. Pat. No. 9,821,721, Vacuum Mounted Carrier For a Vehicle), incorporated herein by reference in full, the clamp 10 or 100 can couple with a very wide variety of articles, including, but not limited to, a bicycle, skis, a snowboard, a surfboard, a canoe, or a kayak.

In the instant embodiment, one or more bikes can be held onto a bike rack via a frame clamp 10 or 100 as described herein. Use of a frame clamp 10 or 100 creates a holding mechanism which securely grabs the bike's frame or other part while encasing it in a cushioned, self-tensioning set of (or interconnected array of) clamp jaws. When used, the frame clamp of the invention, in certain embodiments, can be the only necessary holding point so that when the clamp lever is released on a crank arm clamp, the bike is immediately free to be taken off the rack. Further, since the bike has not previously been dismantled for transport, it is immediately ready to be ridden.

Changes can be made in the above constructions without departing from the scope of the disclosure. It is intended that all matter contained in the above description or shown in the accompanying drawings shall be interpreted as illustrative and not in a limiting sense.

The invention claimed is:

1. A quick-release clamp for a vehicular bicycle mount, said clamp comprising:
   a. a substantially rigid stationary first jaw, said first jaw having a clamping surface;
   b. a substantially rigid second jaw opposite said first jaw, said second jaw having a clamping surface oriented to face at least in part said first jaw clamping surface, said second jaw selectively movable between a first position in which the second jaw is sufficiently proximate the first jaw to retain an elongated object to be clamped transversely between said jaws and a second position in which the second jaw is sufficiently distanced from the first jaw to allow said object to enter or exit from between said jaws;
   c. a lever, said lever being operatively associated with said first and second jaws to urge said second jaw relative to said first jaw, said lever being movable between a closed position in which the lever positions said second jaw sufficiently proximate said first jaw to secure said elongated object to be clamped between said jaws and an open position in which the lever positions said second jaw sufficiently apart from said first jaw so as to release said elongated object from between said jaws; and
   d. a tensioning system comprising a biasing member, said tensioning system being operatively associated with said second jaw and said lever, said biasing member applying a bias between said second jaw and said lever to urge said lever toward said closed position; wherein said tensioning system releases the bias from the lever when the lever is in said open position; and,
   e. further comprising a pivot between said first and second jaws, and wherein said tensioning system further comprises a jaw tab having a proximal end attached to the first jaw and a distal end opposite the proximal end, said distal end being pivotally attached to said lever at a position separated from said first and second jaw pivot.

2. The quick-release clamp of claim 1, further comprising a pliant jaw liner, said jaw liner positioned at least in part on the clamping surface of one of said first jaw and said second jaw, said jaw liner constructed and sized to press against at least a portion of said elongated object to be clamped between said first and second jaws when said second jaw is in its second position.

3. The quick-release clamp of claim 2, wherein said jaw liner has a first surface contour oriented toward the other of said first jaw and said second jaw, said first surface contour shaped to matingly and snugly receive at least a portion of said elongated object to be clamped.

4. The quick-release clamp of claim 2, wherein said jaw liner comprises a first member and a second member, said first member being positioned at least in part on the clamping surface of one of said first jaw and said second jaw.

5. The quick-release clamp of claim 4, wherein the second member of said jaw liner is positioned at least in part on the clamping surface of the other of said first jaw and said second jaw.

6. The quick-release clamp of claim 2, wherein said jaw liner contour comprises a grip shaped to nestingly receive at least a portion of said elongated object to be clamped.

7. The quick-release clamp of claim 6, wherein the grip of said jaw liner contour comprises an elastic detent.

8. The quick-release clamp of claim 1, wherein said tensioning system pivotally attaches to said lever.

9. The quick-release clamp of claim 8, wherein said tensioning system pivots relative to said lever at a position separated from said first and second jaw pivot and separated from said lever and jaw tab pivot.

10. The quick-release clamp of claim 1, wherein said tensioning system biasing member comprises a spring.

11. The quick-release clamp of claim 1, further comprising a lever lock, said lever lock adjustably setting the closed position of the lever to accommodate different sizes, shapes and types of objects to be clamped, such as for example various bike frames and other portions of bicycles/recreational devices.

12. An auto-closing clamp for a vehicular mount, the clamp comprising:
   a. a substantially rigid stationary base, said base being adapted for attachment to a vehicle;
   b. a substantially rigid first jaw attached to said base, said first jaw having a clamping surface;
   c. a substantially rigid second jaw, said second jaw having a clamping surface, said second jaw clamping surface facing at least in part said first jaw clamping surface, said first and second jaws shaped and sized to collectively transversely grasp an elongated object desired to be clamped there between;
   d. an activator operatively associated with the second jaw, said activator urging said second jaw from a first position in which the second jaw is sufficiently distanced from the first jaw to allow said elongated object to be clamped to enter and exit between said first and second jaws and a second position in which the second jaw is sufficiently proximate the first jaw to retain said elongated object to be clamped between said first and second jaws; and
   e. a trigger comprising a jaw tab operatively associated with said activator, said trigger causing said activator to urge the second jaw to its second position when said trigger is tripped.

13. The auto-closing clamp of claim 12, wherein said activator comprises a spring tension loading mechanism.

14. The auto-closing clamp of claim 12, wherein said activator is further operatively associated with the first jaw, said activator urging said first and second jaws toward each other.

15. The auto-closing clamp of claim 12, further comprising a pliant jaw liner, said jaw liner positioned at least in part on the clamping surface of one of said first jaw and said second jaw, said jaw liner constructed and sized to press against at least a portion of said elongated object to be clamped between said first and second jaws when said second jaw is in its second position.

16. The auto-closing clamp of claim 12, wherein said first and second jaws are shaped and sized to clamp a bicycle wheel.

17. The auto-closing clamp of claim 16, further comprising a wheel tray attached to said base, said wheel tray positioned and oriented relative to the first and second jaws to allow a bicycle wheel to be positioned in said wheel tray while at the same time another component of the bicycle is clamped between said first and second jaws.

* * * * *